US008689058B2

(12) United States Patent
Thimmappa et al.

(10) Patent No.: US 8,689,058 B2
(45) Date of Patent: Apr. 1, 2014

(54) CENTRALIZED SERVICE OUTAGE COMMUNICATION

(75) Inventors: Mohan Thimmappa, Redmond, WA (US); Vani Mandava, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 293 days.

(21) Appl. No.: 12/748,092

(22) Filed: Mar. 26, 2010

(65) Prior Publication Data

US 2011/0239057 A1 Sep. 29, 2011

(51) Int. Cl.
*G06F 11/00* (2006.01)

(52) U.S. Cl.
USPC ................. 714/48; 714/43; 714/4.1

(58) Field of Classification Search
USPC .......................................... 714/48
See application file for complete search history.

(56) References Cited

U.S. PATENT DOCUMENTS

| | | | |
|---|---|---|---|
| 7,058,968 B2 | 6/2006 | Rowland et al. | |
| 7,103,652 B1 * | 9/2006 | Dobberpuhl et al. | 709/223 |
| 7,389,339 B1 * | 6/2008 | Dobberpuhl et al. | 709/223 |
| 7,536,606 B2 * | 5/2009 | Andrews et al. | 714/43 |
| 7,542,428 B1 * | 6/2009 | Johnson et al. | 370/241 |
| 8,024,607 B2 * | 9/2011 | Ladd et al. | 714/25 |
| 8,028,199 B1 * | 9/2011 | Guruprasad et al. | 714/43 |
| 8,046,636 B2 * | 10/2011 | Ladd et al. | 714/25 |
| 2002/0143920 A1 * | 10/2002 | Dev et al. | 709/223 |
| 2003/0126590 A1 * | 7/2003 | Burrows et al. | 717/154 |
| 2005/0257098 A1 * | 11/2005 | Andrews et al. | 714/43 |
| 2006/0072707 A1 * | 4/2006 | Araujo et al. | 379/1.01 |
| 2008/0077517 A1 * | 3/2008 | Sappington | 705/35 |
| 2008/0307099 A1 * | 12/2008 | Ueoka et al. | 709/228 |
| 2009/0013210 A1 * | 1/2009 | McIntosh et al. | 714/4 |
| 2009/0028135 A1 | 1/2009 | Mantripragada et al. | |
| 2009/0046846 A1 * | 2/2009 | Lew et al. | 379/265.11 |
| 2009/0259630 A1 | 10/2009 | Goodman et al. | |
| 2009/0287837 A1 * | 11/2009 | Felsher | 709/229 |
| 2009/0313386 A1 * | 12/2009 | Hamamoto et al. | 709/245 |
| 2010/0138688 A1 * | 6/2010 | Sykes et al. | 714/4 |
| 2011/0004487 A1 * | 1/2011 | Schoenberg | 705/2 |
| 2011/0176598 A1 * | 7/2011 | Kohout et al. | 375/227 |

OTHER PUBLICATIONS

CiscoWorks IP Communications Operations Manager 1.0—Published Date: 2005 http://www.cisco.com/en/US/prod/collateral/netmgtsw/ps6491/ps6705/ps6535/ps6543/prod_qas0900aecd8031ca8b.html (7 pages).

(Continued)

*Primary Examiner* — Kamini Patel
(74) *Attorney, Agent, or Firm* — David Andrews; Louise Bowman; Micky Minhas

(57) ABSTRACT

The centralized reporting of a service outage, where the service is offered over a network such as, for example, the Internet. Upon detecting a service outage, computing system automatically identifies characteristic(s) of the outage. Then, the computing system selects a way of reporting the outage that depends on the characteristic(s) of the outage. For instance, depending on the outage characteristic(s), the computing system might cause a particular communication channel or channels to be selected for reporting the outage. Alternatively or in addition, the content or structure of the report may differ depending on the characteristic(s) of the outage. The reporting mechanism may be centralized and service a number of other services, and even report regarding errors in the framework that supports the service.

19 Claims, 3 Drawing Sheets

(56) References Cited

OTHER PUBLICATIONS

Lippis Report Issue 82: Securing Unified Communications Infrastructure—Published Date: 2007 http://lippisreport.com/2007/05/lippis-report-issue-82-securing-unified-communications-infrastructure/ (6 pages).

IBM Express Remote Managed Infrastructure Services (ERMIS)—Published Date: 2009 http://www-935.ibm.com/services/in/gts/pdf/ermis_datasheet_in.pdf (4 pages).

Networking and Unified Communications—Retrieved Date: Jan. 28, 2010 http://www.biztechmagazine.com/whitepapers/documents/networking-and-unified-communications.pdf (8 pages).

* cited by examiner

CENTRALIZED SERVICE OUTAGE COMMUNICATION

BACKGROUND

A wide variety of services are offered over the Internet. Web Services is a list of standards (often identified by the prefix "WS" such as WS-Security, WS-Policy, WS-Addressing, and so forth) whereby applications may be generated to offer a wide-variety of services over the Internet. However, other services are offered that do not use the Web Services standards. While services are valuable in providing users with requested services a vast majority of the time, services can experience occasional service outages for any one of a variety of reasons. Once a service outage is discovered, an administrator may diagnose the cause of the outage, and fix it.

Sometimes, when a service is having an outage, the user may simply see a simple message indicating that the server or service is not responding, but receive little information regarding when the service is anticipated to be back up, or regarding the nature of scope of the outage. Sometimes, specific applications will have ways of alerting administrators or users when the application is having a problem. However, such alerting mechanisms are not common across all applications, and have lesser or no capability for alerting administrators or users when an outage is caused by a system failure outside of the application perhaps within the framework that supports the application.

BRIEF SUMMARY

At least one embodiment described herein relates to the reporting of a service outage, where the service is offered over a network such as, for example, the Internet. Upon a computing system detecting a service outage, the computing system automatically identifies one or more characteristics of the outage. Then, the computing system selects a way of reporting the outage that depends on the characteristic(s) of the outage. For instance, depending on the outage characteristic(s), the computing system might cause a particular communication channel or channels to be selected for reporting the outage. Alternatively or in addition, the content or structure of the report may differ depending on the characteristic(s) of the outage.

In one embodiment, the reporting mechanism is independent of the actual service that failed. In that sense, the reporting mechanism may serve a number of other services in a centralized fashion. Even errors that occur outside of a service but within a framework that supports the service may be reported using the centralized reporting mechanism. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, centralized reporting of a service outage is described. The service may be offered over a network such as, for example, the Internet. Upon detecting a service outage, a computing system automatically identifies characteristic(s) of the outage. Then, the computing system selects a way of reporting the outage that depends on the characteristic(s) of the outage. First, some introductory discussion regarding computing systems will be described with respect to FIG. 1. Then, various embodiments of the outage reporting will be described with reference to FIGS. 2 and 3.

Figure 1:
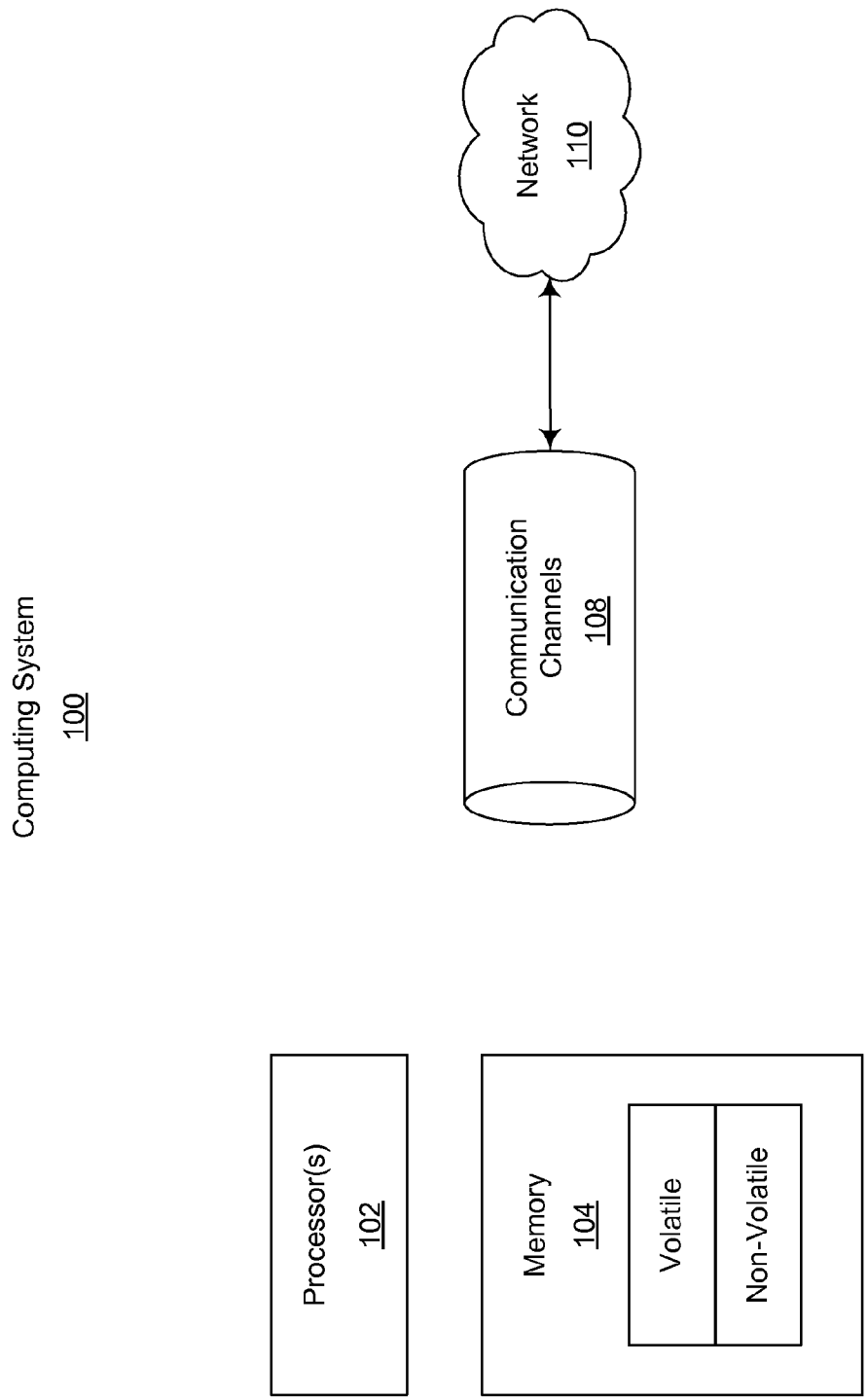
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include a computer program product having computer-readable media for carrying or having computer-executable instructions or data structures stored thereon. Such computer-readable media (or machine-readable media) can be any available media that can be accessed by a general purpose or special purpose computer. By way of example, and not limitation, such computer-readable media can comprise physical storage and/or memory media such as RAM, ROM, EEPROM, CD-ROM, DVD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. The computer-executable instructions cause the computer or processing device to perform the function or group of functions because the computer-executable instructions have a certain structure. If digitally represented, for example, such structures may represent one or more bits of information. In the case of magnetic storage media, for example, such as structure may be a level and/or orientation of magnetism on the media at predetermined parts of the magnetic storage media. In the case of optical storage media, for example, such a structure may be a level of reflectivity of the media at particular predetermined parts of the optical media.

Figure 2:
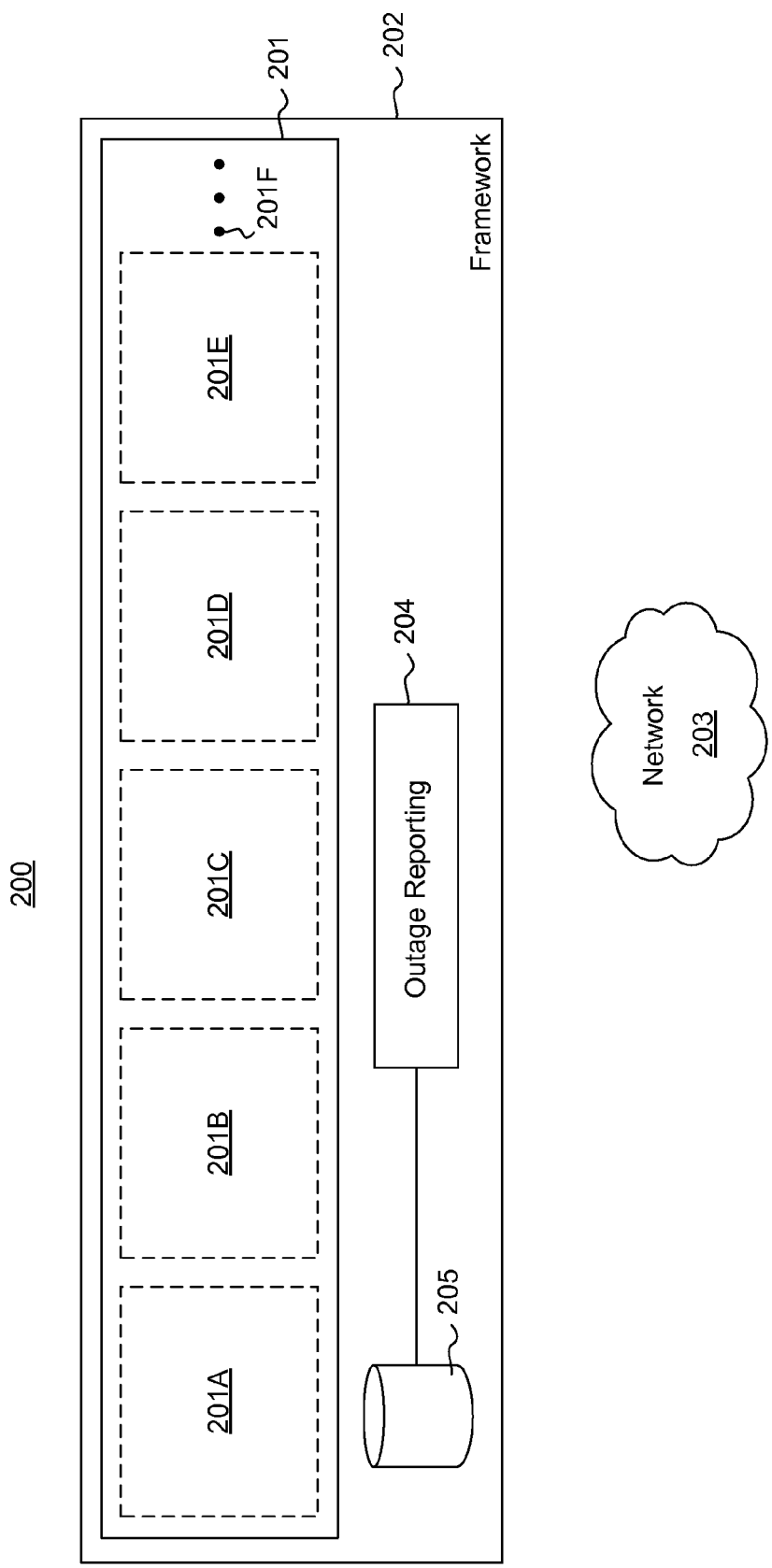
FIG. 2 illustrates an environment that includes multiple services operable by a supporting framework.

FIG. 2 illustrates an environment 200 that includes multiple services 201 operable by a supporting framework 202. In the illustrated embodiment, the environment 200 includes five services 201A, 201B, 201C, 201D, and 201E. However, there may be fewer or greater than this number as represented by the ellipses 201F. The services 201 each provide one or more services over a network 203 (such as the internet) for one of more client computing systems. The services 201 may each be included on a single computing system, or may be distributed across multiple computing systems, each being configured perhaps as described with respect to the computing system 100 shown in FIG. 1.

The framework 202 provides common functionality to each of the services 201. For instance, the framework 202 might provide logging functionality, performance monitoring functionality, or the like. As one example, the framework 202 provides outage reporting functionality 204. When an outage is detected in any one or a subset or all of the services 201, the reporting functionality 204 determines whether to report, how to report, and what to report. More regarding the reporting functionality will be described further below. The reporting functionality 204 may report outages regarding the services 201, thereby alleviating the services 201 themselves from having to have separate functionality to report their own outages. Furthermore, the reporting functionality 204 may also report regarding any outages that occur in the framework 202 that supports the services 201.

The outage reporting functionality 204 may be provided by, for example, a computing system (such as the computing system 100 of FIG. 1) that is structured to have a computer program product (either fixed within the computing system—such as a hard drive, or removably inserted within the computing system—such as an optical disk or solid state memory device). The computer program product may be structured to have computer executable instructions thereon that, when executed by one or more processors of the computing system, cause the computing system to provide the outage reporting functionality. Note that when computer-executable instructions are stored on a computer-readable medium, the storing has the effect of changing the very structure of the computer-readable media. For instance, the structure of optical computer-readable media is altered such that the reflectivity or transparency of the material is altered. The structure of magnetic computer-readable media is altered such that the magnetism of particular regions of the material is altered.

Figure 3:
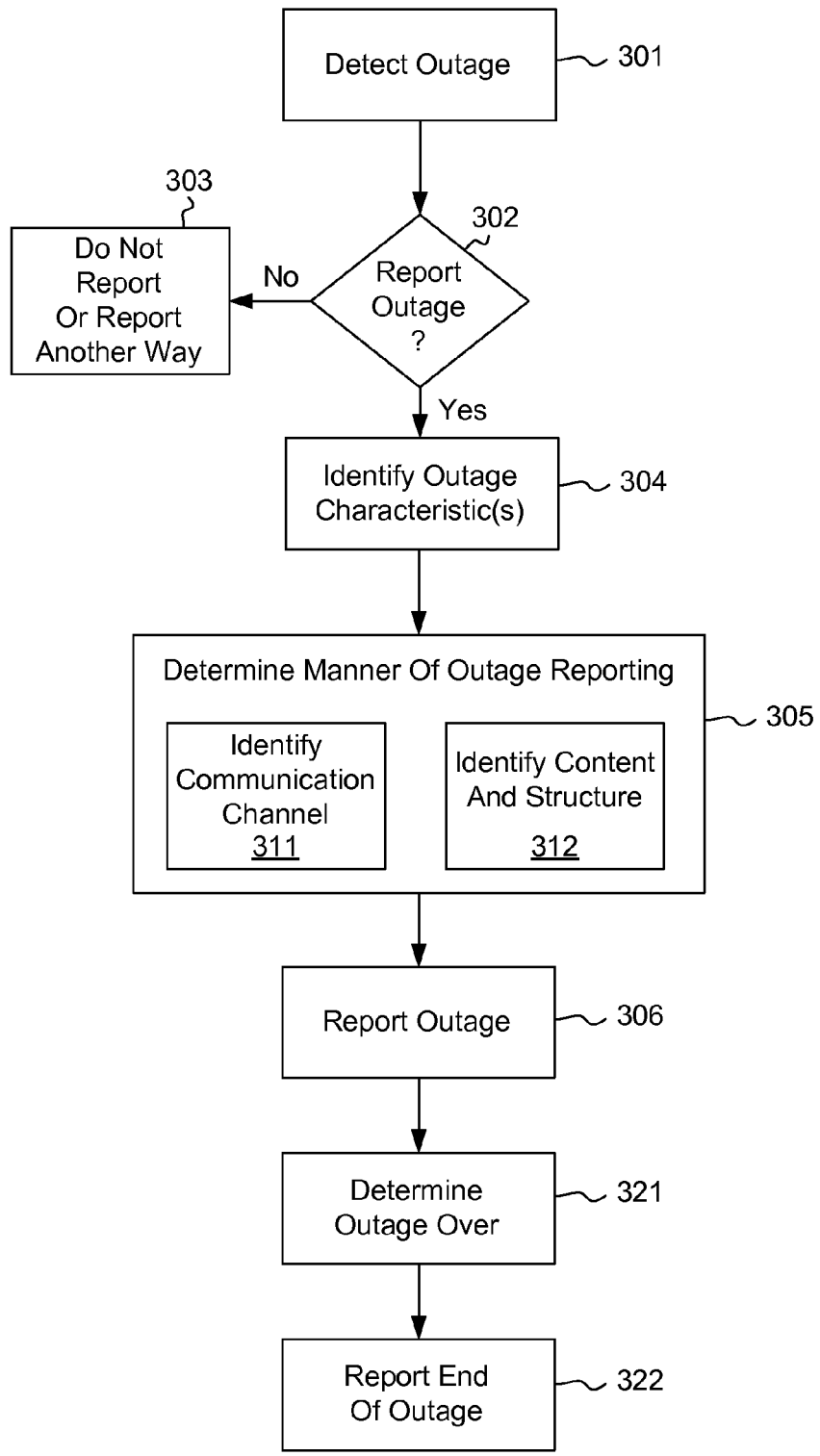
FIG. 3 illustrates a flowchart of a method for a computing system to report a service outage of a service offered over a network.

FIG. 3 illustrates a flowchart of a method 300 for a computing system to report a service outage of a service offered over a network. For instance, the method 300 may be performed by the computing system that implements the outage reporting functionality 204 of FIG. 2, by executing an appropriately-structured computer program product to thereby report regarding outages in the services 201 or in the framework 202. Hereinafter, the framework 202 will also be referred to as a "service".

The method 300 includes the computing system detecting an outage in the service (act 301). This may be accomplished in a variety of ways. As an example, the framework 202 or any of the services might have monitoring capability for monitoring one or more elements of functionality of one or more services. The monitoring may be computer-implemented in the form of a module that periodically or continuously monitors services. The intensity of such monitoring may depend on the sensitivity of the service to downtime.

Alternatively or in addition, the outage may be reported by users of the service. Other potential sources of outage detection might include operations, which fields calls regarding downtime in a service, or perhaps there are communities that report regarding the service outage.

In one embodiment, regardless of how the service outage occurs, the outage may be reported into a centralized store (see store 205 of FIG. 2) that is accessible to the outage reporting functionality 204. The outage reporting functionality may receive an alert when a new outage is reported into the store 205. Alternatively or in addition, the outage reporting functionality may check the store 205 periodically for new outages.

Referring back to FIG. 3, once the outage is detected (act 301), the computing system automatically determines whether or not the outage should be reported (decision block 302). In one embodiment, outages are always reported (always Yes in decision block 302, and never No in decision block 302). However, in some embodiment, perhaps not all of the outages are reported. For example, perhaps the outage reporting functionality 204 is offered by subscription, and some services perhaps have not subscribed to the functionality. Alternatively or in addition, perhaps those services that are compatible with the outage reporting functionality are offered the outage reporting functionality, but not those that are not. Alternatively or in addition, perhaps some outages are not substantial enough to invoke the outage reporting functionality.

In any case, if an outage is detected (act 301), but the outage should not be reported (No in decision block 302), then the outage is not reported using the method 300 of FIG. 3. On the other hand, if the outage is to be reported (Yes in decision block 302), then the method 300 continues.

Specifically, the computing system identifying one or more characteristics of the outage (act 304). As an example, the service may be experiencing a complete outage. For instance, an e-mail service may be completely down. The service might also just be experiencing an outage in a feature. For instance, in the e-mail service, perhaps only the address book is down, but the e-mail service otherwise is working in that e-mail are being received and dispatched. The service might be a cluster-specific outage. For instance, the e-mail service might be a world-wide service, and perhaps there is a cluster of servers in a region of a country that is down, but otherwise, the e-mail service is operational. The characteristics of the outage may be derived from the outage notification provided in the store 205, or may be obtained from subsequent queries to computing entities and/or human beings.

Once it has been decided to report the outage (Yes in decision block 302), and once the characteristic(s) of the outage have been identified (act 304), the way of reporting the outage is determined (act 305) based at least in part upon the identified characteristic(s) of the outage. This way of communicating may include the selection of one or more amongst multiple communication channels over which to communicate the outage report (act 311), the communication channel defined by the manner of communication as well as the target of the communication.

As an example, the outage report may be dispatched by electronic mail (or "e-mail") or text message (e.g., SMS) to perhaps notify potentially impacted users of the service, potential support personnel that might help fix the outage, other monitoring personnel that are interested in the outage, and the like. Another communication channel might be a social networking site that notifies users, community members, and/or support personnel about the outage. Alternatively or in addition, a communication channel might include a community communication such as, for example, a blog entry. Alternatively or in addition, the communication channel might be an in-product communication that communications the outage through a client-side portion of the application that interfaces with the service. For instance, the client-side portion of the application could be a browser, or another application running on the customer's computing system.

The determination of the manner in which to report the outage (act 305) may also include the actual selection of the content and/or structure of the report to send through the communication channel (act 312). There perhaps may be some content that is to be reported regardless of the characteristics of the outage. Such content might include, for example, a description of the outage, a recitation of the potential user impact, possible workarounds for the outage, and an estimated time of restoration for the service. However, there might also be custom pieces of content that may be relevant depending on the characteristic(s) of the outage. For instance, in the case of a feature specific outage, there might also be a description of the feature that is anticipated to be out.

In addition to the content itself, the structure of the report (e.g., a report template) may be identified that may also depend on the identified characteristics of the outage. The content regarding the outage may then be used to populate the template.

The computing system then reports the outage (act 306). For each selected communication channel to send the outage report over, the computing system selects and populates the appropriate template, and dispatches the populated template over that communication channel. As an example, suppose that an e-mail service has gone down, and it is a feature-level outage (e.g., the address book feature is not functioning). In that case, the reporting functionality might elect to send a report over two different communications channels, one by e-mail to the users of the e-mail service, and one by e-mail to the support staff. The e-mail to the user might have a particular structure, but just indicate that the address book is down, might describe the e-mail receipt is not affected, but that e-mails can be sent by specifying the e-mail address of the destination in the various e-mail fields of the e-mail being sent. The e-mail might specify that the service is anticipated to be back up within 2 hours. The e-mail to the support staff might give data such as, the IP address of the server that appears to be non-functional, a log of the last 100 entries in the service log, and indication of when the return of functionality was estimated to customers (e.g., 2 hours), and perhaps a contacts list for personnel specially suited to assist in resolving the problem.

If, on the other hand, the e-mail service outage had been a complete outage of the e-mail service, then e-mail might not be an option for informing the user of the outage. Instead, the client-side application might be instructed to pop-up a window having certain content, where the content is delivered in a manner other than e-mail. Likewise, the support staff might have been informed via a blog entry on a community chat group.

One the service outage has ended, a similar report may be provided into the centralized store 205 of FIG. 2 to indicate such. The reporting functionality 204 may then detect that the outage has ended (act 321), whereupon the end of the service outage may be reported through various communication channels (act 322). The report of the end of the service outage may be communicated over the same or different communications channels than the beginning of the service outage. For instance, in the example in which the e-mail service experienced an outage in the address book, an e-mail may be used to communicate the beginning and the end of the outage to the user. However, the content and structure of the report of the end of the service outage may be different than the content and structure of the report of the beginning of the service outage. For instance, the end of service outage report might include a simple indication that the outage has ended, a description of the outage, and a time that the outage had ended. In the example in which the e-mail service experienced a complete service outage, the users could not be communicated with via e-mail, accordingly, blog entries or in-product messages were used to communicate the beginning of the service outage, but additionally e-mail may be used to communicate the end of the service outage.

Accordingly, a mechanism for centralized reporting of service outages is described. The same reporting infrastructure may be used regardless of which service has the outage, and regardless of the type of outage. The services themselves thus need not incorporate such functionality.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical computer-readable storage media having thereon computer-executable instructions that, when executed by one or more processors of the computing system, cause a computing system to report a service outage of a service offered over the Internet by performing the following:
   the computing system detecting an outage in a service offered over the Internet;
   the computing system identifying one or more characteristics of the outage;
   based at least in part upon the one or more characteristics of the outage, the computing system automatically determining that the outage should be reported;
   based at least in part upon the one or more characteristics of the outage, the computing system selecting a method for reporting the outage to a target, selecting a method for reporting the outage to a target comprising:
      based at least in part upon the one or more characteristics of the outage, selecting a reporting communications channel from a plurality of reporting communications channels, the reporting communications channel to be used to report the detected outage and the reporting communications channel defining a manner of communication of an outage report,
      based at least in part upon the one or more characteristics of the outage, identifying a structure for the outage report,
      based at least in part upon the one or more characteristics of the outage, identifying content for the outage report, and
      based at least in part upon the one or more characteristics of the outage, identifying a target for the outage report; and
   sending the outage report including the content to the target via the selected reporting communications channel.

2. The computer program product in accordance with claim 1, wherein the one or more computer-readable media are further structured such that the computing system further reports the outage over the selected reporting communication channel.

3. The computer program product in accordance with claim 1, wherein one of the plurality of communications channels comprises electronic mail.

4. The computer program product in accordance with claim 1, wherein one of the plurality of communication channels comprises a social networking communication.

5. The computer program product in accordance with claim 1, wherein one of the plurality of communication channels comprises a client-side in-product communication.

6. The computer program product in accordance with claim 1, wherein the selected reporting communication channel communicates with support.

7. The computer program product in accordance with claim 1, wherein the selected reporting communication channel communicates with a plurality of users of the service, at least one of which being by text.

8. The computer program product in accordance with claim 1, wherein the one or more computer-readable media are further structured such that the computing system does not report regarding all detected outages.

9. The computer program product in accordance with claim 1, wherein the one or more computer-readable media are further structured such that the computing system further selects a communication template to use depending at least in part upon the identified one or more characteristics of the outage.

10. The computer program product in accordance with claim 9, wherein the one or more computer-readable media are further structured such that the computing system populates the selected communication template with data regarding the detected outage.

11. The computer program product in accordance with claim 10, wherein the one or more computer-readable media are further structured such that the computing system further reports the outage over the selected reporting communication channel by communicating the populated communication template over the selected reporting communication channel.

12. The computer program product in accordance with claim 1, wherein the act of the computing system detecting an outage comprises an act of the computing system checking with a centralized database that stores outage information for a plurality of applications.

13. The computer program product in accordance with claim 1, wherein the one or more computer-executable instructions are further structured such that the computing system also performs the following:
   an act of the computing system detecting that the outage has ended.

14. The computer program product in accordance with claim 13, wherein the one or more computer-executable instructions are further structured such that the computing system reports that the outage has ended.

15. A computer program product comprising one or more physical computer-readable storage media having thereon computer-executable instructions that, when executed by one or more processors of the computing system, cause a computing system to report a service outage of a service offered over the Internet by performing the following:
   the computing system detecting an outage in a network service;
   the computing system identifying one or more characteristics of the outage;
   based at least in part upon the one or more characteristics of the outage, the computing system selecting a method for reporting the outage to a target, selecting a method for reporting the outage to a target comprising:
      based at least in part upon the one or more characteristics of the outage, selecting a reporting communications channel from a plurality of reporting communications channels, the reporting communications channel to be used to report the detected outage and the reporting communications channel defining a manner of communication of an outage report,
      based at least in part upon the one or more characteristics of the outage, identifying a structure and content for the outage report, the structure for the outage report being defined by a template chosen based at least in part upon the one or more characteristics of the outage,
      based at least in part upon the one or more characteristics of the outage, identifying a target for the outage report.

16. The computer program product in accordance with claim 15, wherein the one or more computer-readable storage media are further structured such that the computing system further reports the outage over the selected reporting communication channel.

17. The computer program product in accordance with claim 15, wherein the one or more computer-readable storage media are further structured such that the computing system does not report regarding all detected outages.

18. The computer program product in accordance with claim 15, wherein the one or more computer readable storage media are structured to detect outages for a plurality of services.

19. A computer-implemented method for a computing system to report a plurality of outages across a plurality of services offered over the Internet, the method comprising the following for each of the plurality of plurality of outages:

detecting the outage;

identifying one or more characteristics of the outage;

based at least in part upon the one or more characteristics of the outage, automatically determining that the outage should be reported;

based at least in part upon the one or more characteristics of the outage, the computing system selecting a method for reporting the outage to a target, selectin a method for reporting the outage to a target comprising:

based at least in part upon the one or more characteristics of the outage, selecting a reporting communications channel from a plurality of reporting communications channels, the reporting communications channel to be used to report the detected outage and the reporting communications channel defining a manner of communication of an outage report, based at least in part upon the one or more characteristics of the outage, identifying a target for the outage report, based at least in part upon the one or more characteristics of the outage, selecting a communication template to be used to construct the outage report, based at least in part upon the one or more characteristics of the outage, identifying content to be used to populate the template, populating the template with the identified content; and communicating the populated communication template over the selected reporting communication channel to the target.

\* \* \* \* \*